United States Patent [19]

Tremblay et al.

[11] 4,225,442

[45] Sep. 30, 1980

[54] CORE SPUN FILTRATION ROVING

[75] Inventors: Maurice H. Tremblay; Robert E. Manning; Gerard Lanoue; Frank Gaiteri, Jr., all of Cockeysville, Md.

[73] Assignee: Brunswick Corporation, Skokie, Ill.

[21] Appl. No.: 935,752

[22] Filed: Aug. 22, 1978

[51] Int. Cl.$^2$ ............... B01D 27/02; B01D 29/08; D02G 3/36; D02G 3/38

[52] U.S. Cl. ............... 210/497.1; 57/210; 57/224; 57/235; 210/457

[58] Field of Search ............... 57/12, 210, 224, 235; 210/457, 489, 494, 497 R, 497.1

[56] References Cited

U.S. PATENT DOCUMENTS

| | | | |
|---|---|---|---|
| 763,377 | 6/1904 | Drury | 57/224 |
| 831,108 | 9/1906 | Ryder | 57/210 |
| 1,958,268 | 5/1934 | Goldman | 210/457 |
| 2,044,130 | 6/1936 | Sowter | 57/210 |
| 2,317,910 | 4/1943 | Hill | 57/224 X |
| 2,503,237 | 4/1950 | Palm et al. | 57/210 |
| 2,526,523 | 10/1950 | Weiss | 57/210 |
| 3,049,153 | 8/1962 | Jones | 57/210 X |
| 3,158,984 | 12/1964 | Butler | 57/210 |
| 3,356,226 | 12/1967 | Miller, Jr. et al. | 210/457 |
| 3,395,527 | 8/1968 | Longley | 57/224 X |
| 3,399,092 | 8/1968 | Adams et al. | 210/457 X |
| 3,828,544 | 8/1974 | Alker | 57/224 X |
| 3,828,934 | 8/1974 | Green et al. | 210/457 |
| 4,100,727 | 7/1978 | Hamel | 57/210 X |

Primary Examiner—John Petrakes
Attorney, Agent, or Firm—John G. Heimovics; William G. Lawler

[57] ABSTRACT

A low twist, high bulk filtration roving is prepared by wrapping a sliver comprised of individual fibers, around a core in the conventional manner. Exemplary of the bulk fibers which may be employed are naturally occurring fibers such as jute, cotton, animal hair; synthetic polymer fibers, such as acrylic, nylon, polyester, olefin, aramid, teflon; man-made organic fibers deriving from natural sources such as rayon or cellulose acetate; and inorganic fibers such as metal, glass, graphite; or a blend of two or more of these fibers. Examples of the core, which can be continuous filaments, monofilaments or spun yarn, are one or more strands of the same composition as the fibers, or a combination thereof, twisted paper which can be plain, impregnated or metallized, and metal wire. Where the material is capable of being cast in film form, slit film may be employed as the strand(s). The composite roving is wound upon a rigid perforated tubular center to form a filter cartridge.

12 Claims, 5 Drawing Figures

TO BOBBIN

CORE SPUN FILTRATION ROVING

BACKGROUND OF THE INVENTION

This field of invention relates to a cored filtration roving, to the method of making such roving and to a wound tube filter incorporating said roving.

DESCRIPTION OF THE PRIOR ART

Filter cartridges are formed generally by winding a fibrous yarn or roving into a tubular form in a crisscross fashion so as to define diamond shaped honeycomb overlapping patterns. These provide the filtering passageways from the outer wall to the center of the cartridge through which the liquids or gases to be filtered are passed. Particles are retained by a network of fibers extending across the passageways and to a lesser extent by the yarn or roving as well.

The art has devised a number of yarns for use in filter cartridges including mainly napped or flocked yarns. In making the roving, draft and twist are applied to slivers on a roving frame before winding on bobbins. The greater the twist given the fibers the closer is the fiber packing and the greater the strength and density of the yarn. In yarns employed heretofor in filter cartridges, as a result of the degree of twist required for strength the central portion of the yarn is not as porous as the outer portion. Accordingly, filtration takes place to a limited degree or not at all through the central portion of the yarn.

The following U.S. patents are noted as illustrating the state of the art as pertains to the present invention:

| 1. CORED YARN | |
| --- | --- |
| 2737,773 | 3137,991 |
| 2746,236 | 3439,491 |
| 2859,583 | 4028,874 |
| 2990,673 | |

| 2. FILTER CARTRIDGE | |
| --- | --- |
| 1958,268 | 3471,028 |
| 2368,216 | 3624,779 |
| 3319,793 | 3648,846 |
| 3356,226 | 3828,934 |
| 3399,092 | |

The concept of core spinning, i.e., spinning a fiber bundle around a continuous or spun yarn central core is well known in the textile industry. However, so far as is known, this concept has not been applied to rovings intended for use in filter cartridges inasmuch as rovings are generally an intermediary product requiring further processing by drafting and twisting to be spun into a yarn. Heretofore, yarns have been formed of fibers of sufficient length to yield a yarn having suitable strength when spun. Layers of yarn wound in a specific pattern on a central cartridge create a multilevel or multilayer "depth" of filtration. Generally, the yarn is napped to enhance the fibrous network extending across the channels or passages formed on the filtration cartridge during the filter winding operation. By varying the spin characteristics of the filter yarn, the efficiency of the fiber structure with regard to the filtration characteristics may be changed and thus effect the overall characteristics of the wound filtration cartridge. Reducing the twist in roving or spinning results in a fuzzier and more permeable yarn.

However, there are limits to the reduction of twist which may be attained. First, spinning on standard textile equipment imposes a definite minimal twist requirement. Second, the filter requirements as to permeability and porosity to provide specified filter characteristics imposes definite limitations on the yarn. If the yarn is too soft or too loosely spun and thus too permeable, for a given size of particulate there is a drop-off in filtration efficiency. Thus, a critical relationship exists between yarn softness, the size of the particulates to be removed and yarn effectiveness in the cartridge filter.

Within the above limitations, a soft or loosely roving generally has a greater dirt holding capacity than tighter twisted yarns, since in the former more fibers are exposed to the filtrate and can serve to entrap particulates. In tighter twisted yarns the central portion is substantially less permeable than the outer portion, the permeability decreasing from the outer perimeter to the center. In such yarns, as little as 10% of the fibers therein have been found to act to retain particulates in filtering action.

SUMMARY

In forming a filtration roving the present invention employs less fiber for the same roving cross-section by providing a strong central strand or strands about which the fibers are twisted to a lesser degree than conventional twisting when forming roving as an intermediate for the production of yarn. This results in a fluffier roving having superior filtration properties with equal or greater mechanical strength. The roving employed may be formed from fibers which are much shorter than those customarily employed since relatively long fibers are not needed for strength purposes in forming the roving. A substantial portion of the required strength of the roving is furnished by the central strand or strands. As a result, less twist is required to produce the required tensile strength. As employed herein the term "strand" encompasses spun thread, filament, monofilament, slit film, twisted paper and the like employed as the core material in the roving.

The tensile strength provided by the central strands results in a significant improvement in efficiency of the various roving spinning, treating and winding operations. Since less twist is required to impart necessary strength, the machine used in roving can be run at a higher level of production and efficiency, as for example with fewer roving breaks and less down time. A more uniform roving is produced which contributes to fewer breaks in the filter cartridge winding operation and fewer rejects of the filters.

In roving bleaching operations, wherein the roving wound on a perforated bobbin is immersed in a bleaching solution, the looser characteristics of the roving fibers permit a deeper and more rapid penetration of the solution. This results in a shorter bleaching time, a whiter product and shorter rinse and drying periods, which translates into overall greater efficiency and cost savings.

The main objects of the present invention are to provide an improved roving for a filtration cartridge having one or more central strands with a relatively high tensile strength surrounded by a mass of loosely twisted fibers, to provide a method for making said roving and to provide a filtration cartridge wherein said roving is wound around a hollow center tube having perforations in its surface.

It is a further object of this invention to employ naturally occurring fibers, synthetic polymer fibers, man-made organic fibers deriving from natural sources, or inorganic fibers in preparing low twist, high bulk roving having one or more central strands.

A further object is to employ short staple cotton waste fibers in preparing the roving.

A further object is to employ as the central strand or strands, threads or filaments of glass, metal, graphite, or other carbon, minerals, paper (plain, impregnated or metallized), naturally occurring fibers, synthetic polymer fibers, man-made organic fibers deriving from natural sources, and slit films of film-forming polymers or of mixtures of at least two of these compositions.

Yet another object is to employ at least one hollow tubular central strand to form a core having a diameter which is a large fraction of the roving diameter.

BRIEF DESCRIPTION OF THE DRAWINGS

FIG. 1 shows the schematic cross-section of a conventional filtration yarn. Reference numeral 1 indicates the yarn generally. The central less permeable portion, which is largely ineffective in filtration is shown at 2, and is shown as having a diameter $d_1$. The filtration portion of the yarn is shown at 3 having a thickness $t_1$. Central portion 2 is more compact due to the tightness of the twist required in the spinning step and for necessary tensile strength. Relatively long staple fibers are employed to make the conventional yarns because of the requirements of the spinning or roving frames.

Figure 1:
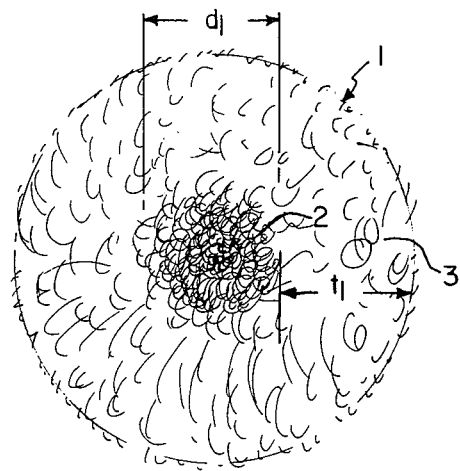
FIG. 1 is a cross-sectional view of conventional yarn employed in a filtration cartridge showing a central dense portion which does not significantly take part in the filtration process.
Figure 2:
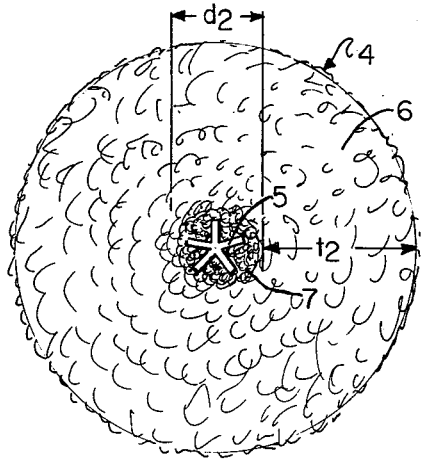
FIG. 2 is a cross-sectional view of one modification of the roving of the present invention showing a central strand.

A schematic cross-section of the improved filter roving of this invention is shown in FIG. 2. Reference numeral 4 indicates this roving generally. A geometrically shaped core strand formed of a synthetic polymer is shown at 5. Wound around the core strand are fibers 6 and immediately surrounding the core is a denser fiber area 7 with a diameter of $d_2$ which has a lessened filtration permeability. The thickness of the porous fiber structure surrounding the core, having satisfactory filtration permeability, is represented by $t_2$. A comparison of $t_1$ and $t_2$ in the cross-sections in FIGS. 1 and 2 indicates the greater relative thickness of the porous fiber structure and thus the greater filtration effectiveness of the improved roving of this invention.

Fiber 6 may be naturally occurring fibers such as jute, cotton, animal hair; synthetic polymer fibers, such as acrylic, nylon, polyester, polyolefin, aramid, Teflon; man-made organic fibers deriving from natural sources such as rayon, cellulose acetate and inorganic fibers such as metal, glass, graphite, or a blend of two or more of these fibers.

Instead of a geometrically shaped core strand 5, the core may be one or more threads, monofilaments, filaments, hollow tubes, or other geometrical shapes. It may be a spun yarn formed from the same material as the fibers, filaments monofilaments of glass, or polymers, (e.g. synthetic polymers or cellulosic derivatives), slit films of film-forming polymers, twisted paper (plain, metallized or impregnated) or metal wires. Other materials for the fibers and strands in addition to those specifically enumerated will be apparent to those skilled in the art.

Figure 3:
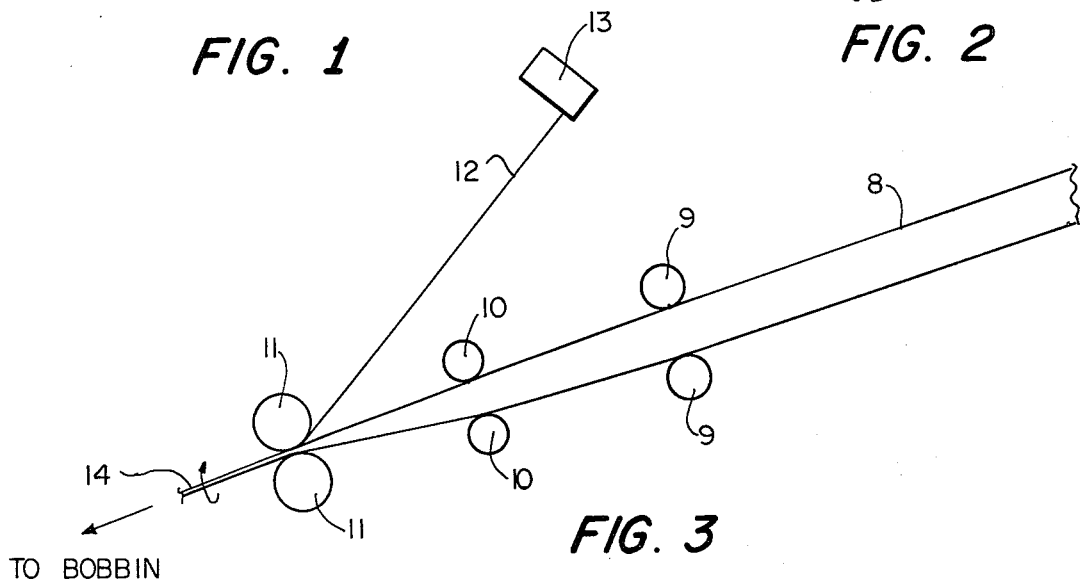
FIG. 3 is a schematic illustrating the method of making the loosely spun roving of the present invention.

One method of making the roving is shown schematically in FIG. 3. While the description will be directed to short cotton fibers, it is to be understood that this is exemplary and that essentially the same process may be employed with other fibers of the same or greater lengths.

Bulk short cotton fibers are formed into a sliver on a conventional carding machine. A sliver 8 passes through a pair of back rolls 9, 9, then undergoes a partial draft in passing through middle rolls 10, 10 and is further drawn down in front rolls 11, 11. Core roving strand 12 is unwound from a spool 13 and is introduced behind rollers 11 on to the sliver. Rolls 11, 11 force core strand 12 into the body of the sliver and thereafter the core and sliver are twisted as indicated by the curved arrow and taken up on a roving bobbin (not shown) to form the filter roving 14.

Because of the superior properties of the filtration roving of this invention, the roving or spinning frame on which the roving is spun can be operated at higher speeds and thus at greater efficiency. By use of a core an 18% increase in speed was attained. Since the cored roving is stronger, there are fewer breaks occurring in winding the roving and better tension control is possible. Other methods of core spinning previously employed only in producing yarn may be employed in forming the roving, such as open end spinning, for example, with similar improved results.

The core material in the present invention may vary from a very small to a very large percentage of the total weight of the roving. Broadly the range may vary from about 0.5 to about 90% with a more preferred range being about 3 to about 40%. Where the roving is formed from cotton slivers and cotton core thread, the core may amount to only about 0.5% of the roving. The added strength of the core permits lower twist requirements for forming the roving. The twist may be lowered by 50%, opening up the roving for enhanced filtering characteristics. Cored roving of this invention is wound in the conventional manner around a rigid perforated tube which is pervious to the flow of liquid through its walls.

It has been discovered that with the core spun roving of this invention, a much shorter cotton staple can be employed. Cotton fibers ranging from as short as about ¼ inch may be used in forming the sliver, with the ¼ inch size ranging up to 50% by weight of the total. Such short fibers are available in large quantities from cotton ginning or combing operations. Instead of cotton, other long or short staple fibers, as listed above, may be employed. The individual roving can also be mixtures of one or more of the above fibers.

As set forth supra, the bulk fibers are formed into a sliver which is drawn and twisted about one or more separate core strands to form the roving. As may be appropriate with the particular strand material employed, the core shape may be hollow tubular, star or other geometrical shaped, ribbons, or threads. Combined with the twisted outer fibers, the central strand core results in a filter roving having the superior performance characteristics of this invention. A particularly useful core would be one of relatively low density with a napped or fibrillated surface.

The filtration effect is spread over the less dense outer perimeter region of the roving, while maintaining appropriate strength with the resultant benefits flowing therefrom. By employing a central core strand having a relatively large diameter and thus spacing the loosely spun fibers around the core circumference, a more efficient filtration effect per unit weight of fibers is obtained as compared with yarns of the same cross-sectional area having a relatively small central strand diameter. However, in overall cost and efficiency considerations, this is but one factor taken into account. Other factors, including inter alia, the relative cost of the yarn and the roving, and the total amount of yarn or roving to be wound to form the filter cartridge for the desired filtration effect must be given due weight. A hollow tube, or one or more strands of various geometrical shapes, e.g. star shaped, may be employed as the core strand(s) in this modification.

Figure 4:
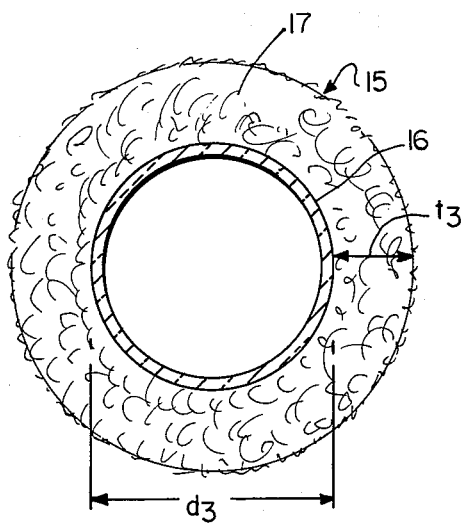
FIG. 4 is a cross-sectional view of another modification of the roving of the present invention.

FIG. 4 illustrates this embodiment, wherein the roving is indicated by reference numeral 15. A hollow central core having diameter $d_3$ is shown by 16, and 17 represents the loosely spun fibers having a thickness $t_3$. As shown in this figure, the use of a relatively large tube as the core results in less fibers in the roving.

Examples of rovings embodying the principles of this invention which are useful in filter cartridges are set forth in the following table.

TABLE 1

| Core Structure | Loosely Spun Fibers |
| --- | --- |
| cotton thread | short fiber cotton |
| polypropylene filaments | polypropylene fibers |
| cotton-polyester thread | short fiber cotton, or short or long synthetic fiber |
| slit polypropylene film | short cotton fibers, short or long synthetic fiber |
| tubular polypropylene | cotton or synthetic fibers |
| rayon thread | rayon, or jute rayon fibers |
| jute-rayon thread | jute-rayon fibers |

Figure 5:
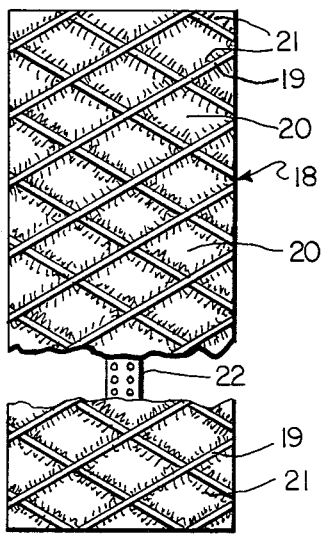
FIG. 5 is a side elevational view of a filtration cartridge of the present invention, broken away to show the hollow perforated center.

The tubular filtration cartridge is indicated generally by numeral 18 in FIG. 5. As shown therein, roving 19 is arranged in a crisscross pattern on a hollow perforated cartridge 22 by the usual winding operation. As the roving is wound back and forth diamond shaped openings 20 are formed where the roving windings corss, and are present in each successive winding layer of roving. Fibers 21 extend from the roving surface into the openings 20, providing filtration regions therein. During the winding operation the roving is napped in order to increase the number of fibers extending across the diamond-shaped openings 20.

Selection of materials for the strand and fiber to form the roving will depend on the fluids to be filtered. Obviously, materials which are unaffected by the filtrate will be selected for any particular application.

What is claimed is:

1. In a filter cartridge comprising a rigid hollow center member pervious to the flow of fluid therethrough and a plurality of layers of roving arranged in a helical pattern over the member forming diamond-shaped openings for entrapment of fine particulates from the fluid, the improved roving comprising:
   (1) at least one central continuous filamentous core, and
   (2) a mass of short staple fibers loosely twisted surrounding and covering the filamentous core, at least some of the fibers having a length of about one-quarter inch, and the core comprising 0.5 percent to 40 percent of the weight of the roving.

2. The filter cartridge of claim 1 wherein the staple fibers are composed of at least one member of the group consisting of naturally occurring fibers, synthetic polymer fibers, man-made organic fibers derived from natural sources and inorganic fibers, and
   the core is composed of at least one member selected from the group of the said roving fibers, twisted plain paper, twisted impregnated paper, twisted metallized paper, slit polymer film, polymer tubes, polymer filaments, glass filaments and metal wire.

3. The cartridge of claim 2 wherein the short fibers and the core have the same compositions.

4. The filter cartridge of claim 2 wherein the short fibers and the core have different compositions.

5. The filter cartridge of claim 2 wherein both the staple fibers and the core comprise cotton.

6. The filter cartridge of claim 2 wherein both the staple fibers and the core comprise polyethylene.

7. The filter cartridge of claim 6 wherein the core comprises a slit film of polyethylene.

8. The filter cartridge of claim 2 wherein both the staple fibers and the core comprise nylon.

9. The filter cartridge of claim 8 wherein the staple fibers comprise a jute-rayon blend.

10. The filter cartridge of claim 2 wherein both the staple fibers and the core comprise polyester.

11. The filter cartridge of claim 2 comprising a roving having as a core at least one geometrically shaped strand with a diameter which is a relatively large fraction of the diameter of the roving.

12. The filter cartridge of claim 1 wherein no more than up to about 50% by weight of the fibers is about ¼ inch.

* * * * *